US010534699B2

(12) United States Patent
Lv et al.

(10) Patent No.: US 10,534,699 B2
(45) Date of Patent: Jan. 14, 2020

(54) METHOD, DEVICE AND COMPUTER PROGRAM PRODUCT FOR EXECUTING TEST CASES

(71) Applicant: EMC IP Holding Company LLC, Hopkinton, MA (US)

(72) Inventors: Shuo Lv, Beijing (CN); Deric Wenjun Wang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/173,077

(22) Filed: Oct. 29, 2018

(65) Prior Publication Data
US 2019/0129833 A1   May 2, 2019

(30) Foreign Application Priority Data
Oct. 27, 2017   (CN) .......................... 201711025184.7

(51) Int. Cl.
*G06F 9/44*       (2018.01)
*G06F 11/36*    (2006.01)
*G06N 5/02*      (2006.01)

(52) U.S. Cl.
CPC ...... *G06F 11/3688* (2013.01); *G06F 11/3612* (2013.01); *G06F 11/3664* (2013.01); *G06F 11/3684* (2013.01); *G06N 5/02* (2013.01)

(58) Field of Classification Search
None
See application file for complete search history.

(56) References Cited

U.S. PATENT DOCUMENTS

| 8,949,793 | B1  | 2/2015  | Basu Mallick et al.          |
|-----------|-----|---------|------------------------------|
| 9,482,464 | B1  | 11/2016 | Burke                        |
| 10,169,206| B2* | 1/2019  | Magre ................. G06F 11/3664 |

OTHER PUBLICATIONS

Kevin P. Twomey, et al.; "Testing Electronic Products Using Smart Allocation of Test Resources Via Resource Mappings," U.S. Appl. No. 14/578,902, filed Dec. 22, 2014.

* cited by examiner

*Primary Examiner* — Qamrun Nahar
(74) *Attorney, Agent, or Firm* — BainwoodHuang (57) ABSTRACT

Embodiments of the present disclosure relate to a method and device for executing test cases. The method comprises obtaining a set of test cases to be executed, and determining a test platform type and a test script associated with each test case in the set of test cases based on a knowledge base. The method further comprises dividing the set of test cases into a plurality of test subsets or test suites based on the test platform type, and executing test cases in each test subset using the respective test environment and test script. In embodiments of the present disclosure, the plurality of test suites are generated automatically based on the knowledge base, and the respective test environment and test script are used for executing each test suite. Accordingly, embodiments of the present disclosure can implement automatic generation and execution of the test suites, and can improve the operation efficiency for test cases.

18 Claims, 7 Drawing Sheets

{:component=>"Expunge", :testname=>snapshot_3_1_6, :script=>"../../bin/test_runner.rb", :params=>"-t snapshot_3_1_6 -d $TARGET_HOST -u $TCMS_USER -p $TCMS_TEST_PLAN -c $LOAD_CLIENT", :minlimitver=>6.0, :timeout=>1200}

FIG. 4

```
CREATE TABLE `test_case` (
    `case_name`    varchar(128)   NOT NULL,
    `component`    varchar(128)   NOT NULL DEFAULT '',
    `hash_line`    varchar(8192)  NOT NULL DEFAULT '',
    `testbed_type` varchar(128)   NOT NULL DEFAULT '',
    PRIMARY KEY (`case_name`)
) ENGINE=InnoDB DEFAULT CHARSET=latin1;
```

FIG. 5

```
CREATE TABLE `test_case_execution_record` (
    `case_name`     varchar(128)    NOT NULL,
    `build_no`      char(8)         NOT NULL,
    `post_time`     datetime        NOT NULL,
    `status`        varchar(16)     NOT NULL,
    `duration`      int             NOT NULL,
    `cmd_id`        char(40)        NOT NULL,
    `log_details`   varchar(2048)   NOT NULL,
    `digest_id`     char(40)        NOT NULL,
    `job_name`      varchar(32)     NOT NULL,
    PRIMARY KEY (`case_name`, `build_no`, `post_time`, `job_name`),
    CONSTRAINT `test_case_execution_record_ibfk_1` FOREIGN KEY (`cmd_id`) REFERENCES `command` (`cmd_id`),
    CONSTRAINT `test_case_execution_record_ibfk_2` FOREIGN KEY (`digest_id`) REFERENCES `hash_digest` (`digest_id`),
    CONSTRAINT `test_case_execution_record_ibfk_3` FOREIGN KEY (`case_name`) REFERENCES `test_case` (`case_name`),
    CONSTRAINT `test_case_execution_record_ibfk_4` FOREIGN KEY (`build_no`) REFERENCES `build` (`build_no`)
ENGINE=InnoDB DEFAULT CHARSET=latin1;
```

METHOD, DEVICE AND COMPUTER PROGRAM PRODUCT FOR EXECUTING TEST CASES

RELATED APPLICATIONS

This application claim priority from Chinese Patent Application Number CN 201711025184.7, filed on Oct. 27, 2017 at the State Intellectual Property Office, China, titled "METHOD, DEVICE AND COMPUTER PROGRAM PRODUCT FOR PERFORMING TEST CASES" the contents of which is herein incorporated by reference in its entirety.

FIELD

Embodiments of the present disclosure generally relate to the field of test, and more specifically to a method, device for and a computer program product executing test cases.

BACKGROUND

A test case refers to a group of test inputs, execution conditions and expected result compiled for a specific purpose, so as to test whether a certain component, module or function satisfies a predetermined demand. To execute the text case automatically, it is necessary to write a respective test script which is usually characterized by a series of program instructions. Generally, the test script is written in a script language. The script language is a programming language such as Ruby, Perl, Python, Shell and C# which focuses on interpretation upon execution.

Generally, each object to be tested comprises a plurality of components, and one or more test cases might exist for each component. Hence, a plurality of test cases, such as a set of test cases, usually need to be executed for the object. A test suite refers to a group of associated test cases in the set of test cases, and is also referred to as a test subset. By use of the test suite, it is possible to execute, in combination, a series of test cases serving the same test target or under the same running environment.

SUMMARY

Embodiments of the present disclosure provide a method, device and a computer program product for executing test cases.

According to one aspect of the present disclosure, there is provided a method for executing a test case. The method comprises: obtaining a set of test cases to be executed, wherein the set of test cases is divided into one or more test subsets; for a test case in the set of test cases, determining a test platform type and a test script associated with the test case based on a knowledge base; determining a test subset to which the test case belongs based on the test platform type; and executing the test case in the test subset based on the test script.

According to another aspect of the present disclosure, there is provided a device for executing a test case. The device comprises a processing unit and a memory coupled to the processing unit and storing instructions thereon. The instructions, when executed by the processing unit, perform the following acts: obtaining a set of test cases to be executed, wherein the set of test cases is divided into one or more test subsets; for a test case in the set of test cases, determining a test platform type and a test script associated with the test case based on a knowledge base; determining a test subset to which the test case belongs based on the test platform type; and executing the test case in the test subset based on the test script.

According to a further aspect of the present disclosure, there is provided a computer program product that is tangibly stored on a non-transient computer readable medium and includes machine-executable instructions. The machine-executable instructions, when executed, cause a computer to execute the method according to embodiments of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other features, advantages and aspects of embodiments of the present disclosure will be made more apparent by describing the present disclosure in more detail with reference to figures. In the figures, the same or like reference signs represent the same or like elements, wherein.

DETAILED DESCRIPTION OF EMBODIMENTS

Preferred embodiments of the present disclosure will be described below in more detail with reference to figures. Although figures show preferred embodiments of the present disclosure, it should be appreciated that the present disclosure may be implemented in various forms and should not be limited by embodiments stated herein. On the contrary, these embodiments are provided to make the present disclosure more apparent and complete, and to convey the scope of the present disclosure entirely to those skilled in the art.

As used herein, the term "include" and its variants are to be read as open terms that mean "include, but is not limited to." Unless otherwise specified, the term "or" represents "and/or". The term "based on" is to be read as "based at least in part on." The term "an implementation" is to be read as "at least one implementation." The term "another implementation" is to be read as "at least one other implementation." Terms "first" and "second" may refer to different or identical objects. In addition, the term "test suite" described herein represents a group of relevant test cases in the test set, it may be divided based on a predetermined policy, and it may also be called a test subset, test subtask or test sub-job. Other explicit or implicit definitions may further be included hereunder.

Conventionally, for a test task including a plurality of text cases, a tester needs to manually combine one or more test cases to generate various test suites, and manually collects test scripts and then executes test. During test, the tester further needs to manually handle test exception, and collect test results one by one. Since the number of test cases might be very large and a conventional test procedure is complicated, a lot of manpower is needed and makes the testing efficiency very low.

Embodiments of the present disclosure propose a solution for executing test case(s). According to embodiments described here, after a set of test cases to be executed is obtained, a test platform type of each test case is determined based on a knowledge base, thereby automatically dividing the set of test cases into a plurality of test suites. Then, a respective test environment and test script are used to automatically execute each test suite. Accordingly, embodiments of the present disclosure can implement automatic generation and execution of the test suites, and can improve the operation efficiency of the test.

In addition, information related to each test case is stored in the knowledge base according to the embodiment of the present disclosure, so the set of test cases to be executed can be very conveniently obtained from the knowledge base. Meanwhile, in embodiments of the present disclosure, when the test suites are divided, thoughts are given to the test platform types of the test cases as well as to total runtime of each test suite, so that the runtime of all test suites differs not much to enable parallel processing among a plurality of test suites.

A regression test refers to, after an old code is amended, performing test again to confirm that the amendment does not introduce new errors or cause other codes to generate errors. The regression test aims to ensure old components or modules can still operate normally when the system adds new components or modules, and ensure constant advancement of new-version systems. Since the test workload of the regression test is very large and test cases that are already test previously are used again, applying the technology of embodiments of the present disclosure to regression test can substantially improve the test efficiency. Those skilled in the art should appreciate that although some implementations of the present disclosure are applied to regression test, embodiments of the present disclosure may also be applied to ordinary hardware and software test.

Reference is made below to FIG. 1 through FIG. 8 to illustrate basic principles and several example implementation modes of the present disclosure. It should be appreciated that these example embodiments are presented here to enable those skilled in the art to better understand and then implement embodiments of the present disclosure, not limit the scope of the present disclosure in any manner.

Figure 1:
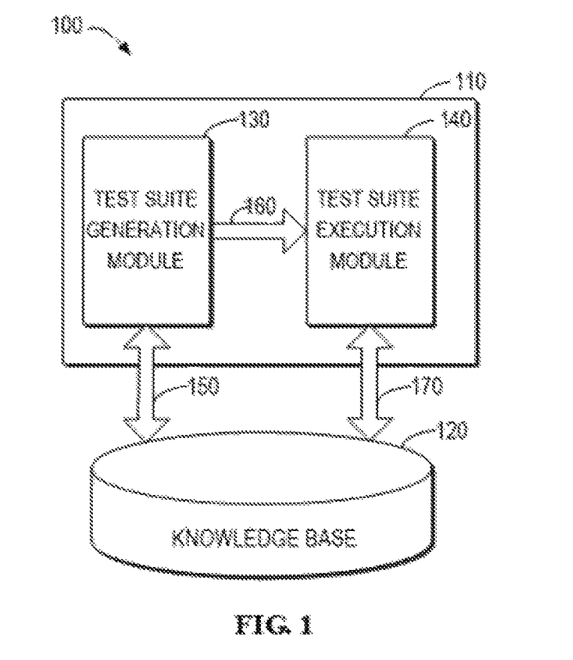
FIG. 1 illustrates a schematic view of architecture of a system for executing a test case according to an embodiment of the present disclosure.

FIG. 1 illustrates a schematic view of an architecture of a system 100 for executing a test case(s) according to an embodiment of the present disclosure. As shown in FIG. 1, the system 100 comprises a device 110 and a knowledge base 120. The device 110 may be various computing devices with a processing capability, and includes but not limited to a personal computer and a server. An example implementation of the device 110 is described with reference to FIG. 8. The knowledge base 120 may be a database or server, it may be located at the local of the device 110 or at the remote (e.g., in cloud) of the device 110, and may communicate with the device 110 via a network. An example implementation of a table in the knowledge base is described with reference to FIG. 5, FIG. 6 and Table 1.

Referring to FIG. 1, the device 110 comprises a test suite generation module 130 and a test suite execution module 140. The test suite generation module 130 may dynamically generate one or more test suites according to the set of test cases (an example implementation of dynamically generating a plurality of test suites is described below with reference to FIG. 3). The test suite execution module 140 may include one or more test execution engines for executing the test suites, as will be described below in detail. In the case of presence of a plurality of test suites (each test suite may include one or more test cases), the plurality of test execution engines in the test suite execution module 140 may execute a plurality of test suites in parallel, and each test execution engine may execute all test cases in each test suite in series.

As shown by arrow 150, the test suite generation module 130 may generate a plurality of test suites based on the knowledge base. As shown by arrow 160, the test suite generation module 130 may transfer the generated plurality of test suites to the test suite execution module 140 for execution. As shown by arrow 170, the test suite execution module 140 executes the plurality of test suites in parallel by querying the knowledge base 120, and may write a test execution record and a test report into the knowledge base 120.

Figure 2:
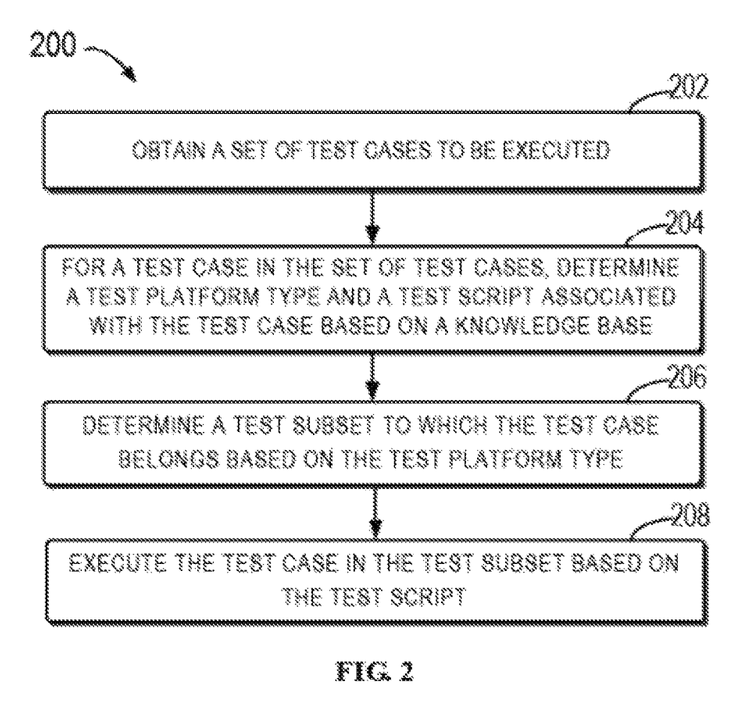
FIG. 2 illustrates a flow chart of a method for executing a test case according to an embodiment of the present disclosure.

FIG. 2 illustrates a flow chart of a method 200 for executing a test case(s) according to an embodiment of the present disclosure. Those skilled in the art should appreciate that the method 200 may be executed by the device 110 described above with reference to FIG. 1 and device 800 described below with reference to FIG. 8.

At 202, a set of test cases to be executed is obtained, and the set of test cases is divided into one or more test subsets (namely, test suites) based on a predetermined policy. For example, the test suite generation module 130 may determine the set of test cases to be executed according to the user's selection, e.g., the user may directly select some test cases. In some embodiments, the test suite generation module 130 may further obtain the set of test cases based on a set of components to be tested and by querying the knowledge base 120. For example, the user may select the components to be tested. The following table 1 shows an example data table in the knowledge base 120.

TABLE 1

Example data table in the knowledge base

| Test case name | Component name | Test platform type | Test script address | Runtime |
| --- | --- | --- | --- | --- |
| Test 1 | Component X | AAA | / . . . /bin/test1.rb | 182 s |
| Test 2 | Component X | AAA | / . . . /bin/test2.rb | 255 s |
| Test 3 | Component X | BBB | / . . . /bin/test3.rb | 72 s |
| Test 4 | Component X | AAA | / . . . /bin/test4.rb | 68 s |
| Test 5 | Component Y | BBB | / . . . /bin/test5.rb | 165 s |
| Test 6 | Component Y | CCC | / . . . /bin/test6.rb | 230 s |
| Test 7 | Component Z | DDD | / . . . /bin/test7.rb | 168 s |
| Test 8 | Component Z | AAA | / . . . /bin/test8.rb | 293 s |
| Test 9 | Component Z | AAA | / . . . /bin/test9.rb | 117 s |
| Test 10 | Component Z | BBB | / . . . /bin/test10.rb | 85 s |

Wherein the example data table in Table 1 includes name of each test case, name of a component to which it belongs, the required test platform type, a corresponding test script address, and runtime spent in running the test. The test cases in the table may be pre-collected test cases. In for example in a scenario of automatic regression test, the test cases in the table may be historical test cases which have been executed.

At 204, for a test case in the set of test cases, a test platform type and a test script associated with the test case is determined based on the knowledge base. For example, the test suite generation module 130 may determine the test platform type, test script address, component name and running information of each test case by querying the knowledge base 120 (a reference implementation of running information is described below with reference to FIG. 4). The knowledge base 120 may store a plurality of test cases written in various programming languages, and the test platform run by it varies with the test cases, wherein the test platform is a running platform of test cases, for example, a hardware system and/or operating system.

At 206, a test subset (namely, test suite) to which the test case belongs is determined according to the test platform type. Optionally, the test suite generation module 130 may group test cases of the same test platform type in a test suite. Alternatively, when the test suites are divided, thoughts are given to the test platform types of the test cases as well as to total runtime of each test suite, so that the runtime of all test suites differs not much to be suitable for parallel processing between a plurality of test suites. In addition, since some test cases will cause damages to the system during execution, these test cases cannot share the test platform. Hence, division of test suites needs to consider improvement of test efficiency as well as some internal other demands.

At 208, the test case(s) in the test subset is executed based on the test script. For examples, the test suite execution module 140 may instantiate a test environment for the test platform type based on the test platform type, and for each test suite, a plurality of test scripts associated with a plurality of test cases in the test suite are executed sequentially.

In some embodiments, the test suite execution module 140 may further obtain running parameters. During the running of the test, the test suite execution module 140 executes parameter substitution, and automatically executes exception processing and fault retry. In some embodiments, after completion of execution of the test subset, the test suite execution module 140 may collect a test result from a running log, and generate a test report based on the collected test results.

In some embodiments, a plurality of test execution engines in the test suite execution module 140 execute a plurality of test suites in parallel, thereby improving the test running speed on the whole. In this way, a plurality of test suites are executed in parallel, and a plurality of test cases of each test suite are executed in series.

Figure 3:
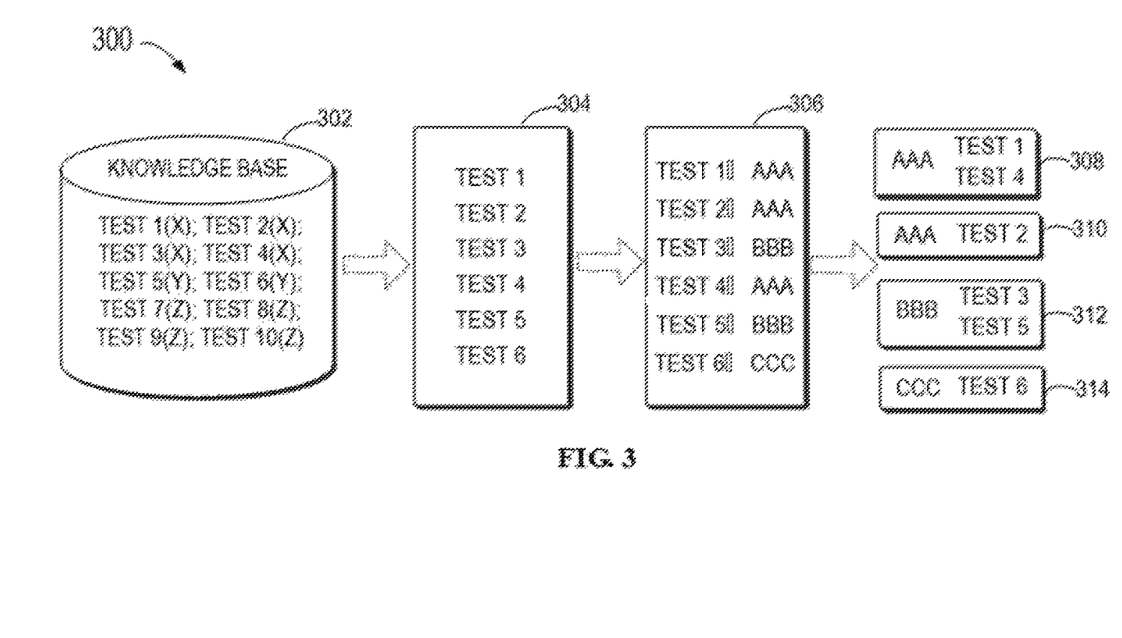
FIG. 3 illustrates a schematic diagram of generation of a test suite according to an embodiment of the present disclosure.

FIG. 3 illustrates a schematic diagram 300 for generating test suite according to an embodiment of the present disclosure. It should be appreciated that a knowledge base 302 in FIG. 3 may be the knowledge base 120 described in FIG. 1, and it is assumed that the knowledge base 302 stores the data table as shown in Table 1. As shown in FIG. 3, the knowledge base 302 includes a plurality of test cases, and each test case is stored in association with the component name corresponding thereto. For example, TEST 1 is performed for Component X, and TEST 5 is performed for Component Y.

In the case that the tester needs to test Component X and Component Y (e.g., the user selects Component X and Component Y through a visualized interface), all test cases associated with Component X and Component Y are obtained to form a set of test cases 304, including TEST 1, TEST 2, TEST 3, TEST 4, TEST 5 and TEST 6. It is possible to, by querying the knowledge base 302, determine the test platform type needed by each test case.

As shown in 306, TEST 1, TEST 2 and TEST 4 run on AAA platform, TEST 3 and TEST 5 run on BBB platform, and TEST 6 runs on CCC platform, wherein platforms AAA, BBB, and CCC may be for example different hardware systems and/or operating systems.

As shown in FIG. 3, it is possible to, based on the test platform types and total runtime of each test suite, the set of test cases 304 is divided into a plurality of test suits that is, namely, a test suite 308 including TEST 1 and TEST 4, a test suite 310 including TEST 2, a test suite 312 including TEST 3 and TEST 5, and a test suite 314 including TEST 6 (if test 1, test 2 and test 4 all are grouped in a test suite, the runtime of this test suite is much larger than other test suites). It should be appreciated that the total runtime of the test suite may not be considered, and the test platform type is only considered. In this case, the test suite 308 and test suite 310 with respect to the test platform type AAA are merged into one test suite.

It should be appreciated that each test script is run as an independent procedure having a corresponding parameter. During the run of the test script, it is necessary to use test script information and some control information (e.g., timeout information). In some embodiments, the test script information may include test case name, name of a component to which the test case belongs, a storage address or location of the test script, and running parameters including variables to be replaced during execution. In some embodiments, the control information may include pass or abortion information of a key test case, minimum version control, maximum version control, log detail degree level, and other information for use in control. These information may be combined together to form running information (also called "hash line") with respect to the test script, and it may be interpreted by the test suite execution module 140 during execution. In some embodiments, deduplication processing may be performed for the running information before the set of test cases is divided into a plurality of test suites.

Figure 4:
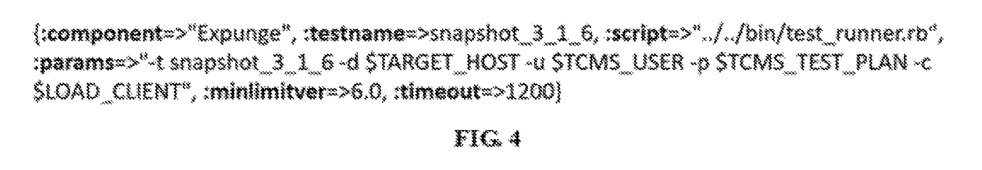
FIG. 4 illustrates a schematic diagram of running information for a test script according to an embodiment of the present disclosure.

FIG. 4 illustrates a schematic diagram of running information for a test script according to an embodiment of the present disclosure. For example, the test suite generation module 130 may obtain the running information of the test script based on the knowledge base 120. As shown in FIG. 4, the running information of the test script may include component name (component field), test case name (testname field), test script address or location (script field), running parameters (params field), minimum version control (minlimitver field) and timeout information (timeout field), and so on.

Figure 5:
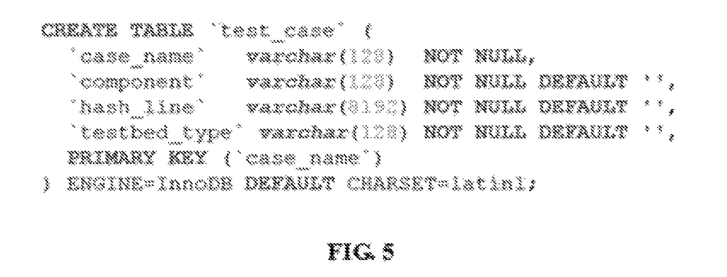
FIG. 5 illustrates a schematic diagram for creating a test case table in a knowledge base according to an embodiment of the present disclosure.

FIG. 5 illustrates a schematic diagram for creating a test case table in a knowledge base according to an embodiment of the present disclosure. During automatic generation of test suites, the test suite generation module 130 may store, in the knowledge base 120, a mapping relationship between test case name and running information (hash line). As shown in FIG. 5, the test case table may include test case name (case_name field), component name (component field), running information (hash_line field), and test platform type (test platform_type field), wherein the test case name is a major key.

Figure 6:
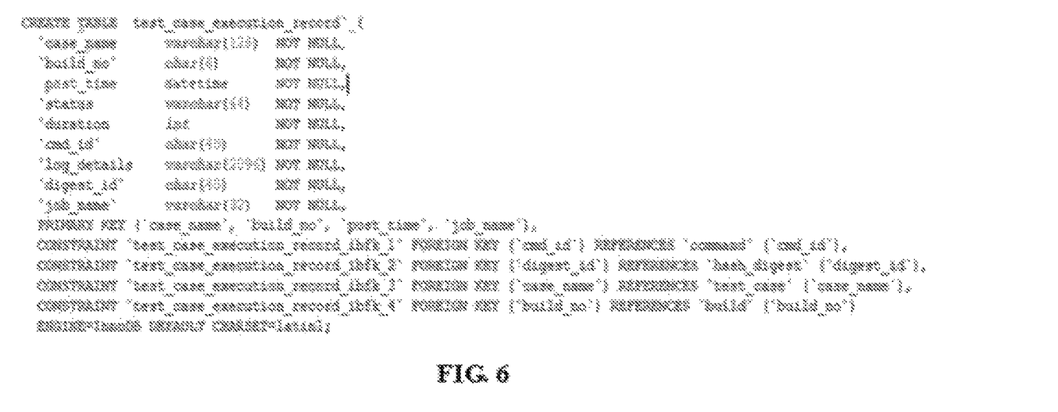
FIG. 6 illustrates a schematic diagram for creating a test case execution record table in a knowledge base according to an embodiment of the present disclosure.

FIG. 6 illustrates a schematic diagram for creating a test cases execution record table in a knowledge base according to an embodiment of the present disclosure. After completing execution of each test suite, the test suite execution module 140 analyzes the generated test log, and stores a test record for each test case into the knowledge base. As shown in FIG. 6, the test case execution record table may include test case name (case_name field), version number (build_no field), post time (post_time field), test status (status field), constant running duration (duration field), commend ID (cmd_id field), log details (log_details field), digest identification (digest_id field), and job name (job_name field).

After completion of execution of all test suites, the system will retrieve test results and generate a final report, then may send the final report to the user in the form of a visualized document (e.g., HTML file). For example, content of the test report may include a test result status (pass or fail) of each test case, log details, test execution duration, and fault situations and so on. In some embodiments, it is possible to store fault information in a fault tracking tool into the knowledge base. In this way, when the same fault happens again next time, fault-related reference information will be retrieved from the knowledge base.

Figure 7:
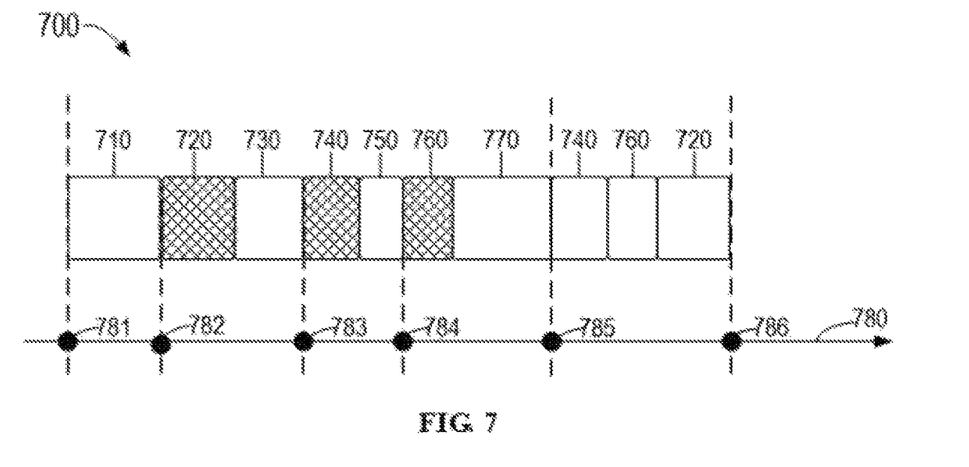
FIG. 7 illustrates a schematic diagram of retry of test cases according to an embodiment of the present disclosure.

During system test, execution of a certain test case or some test cases may need to depend on other test cases. Hence, if faults happen during the test, it is possible to adjust the order of faults and then retry the faults. For example, the test suite execution module 140 may, in response to a plurality of faults happening during execution of the test subset, adjust the order of the first test case associated with the first fault in the plurality of faults to be after the second test case associated with the second fault. Then, for the adjusted plurality of faults, the test suite execution module 140 may execute test cases associated with the plurality of faults again.

FIG. 7 illustrates a schematic diagram 700 of retry of test cases according to an embodiment of the present disclosure. As shown in FIG. 7, on a time axis 780, during the running of the first round of tests from a time point 781 to a time point 785, seven test cases 710, 720, 730, 740, 750, 760 and 770 in a certain test suite are executed sequentially. However, at the time point 782, a test case 720 fails; at a time point 783, a test case 740 fails; and at a time point 784, a test case 760 fails.

According to embodiments of the present disclosure, the execution order of failed test cases may be adjusted, and then tests are executed again. For example, the test case 720 that fails the earliest is adjusted to be executed finally. Further referring to FIG. 7, during a second round of execution from a time point 785 to a time point 786, the test case 740, test case 760 and test case 720 are executed in an adjusted order, thereby enabling all the three test cases to pass successfully. Those skilled in the art should appreciate that if faults still happen after the adjustment, it may repeat the above procedure to continue to adjust the running order of failed test cases.

Hence, according to the technique of the embodiment of the present disclosure, the user only needs to select components or test cases to be tested, regardless how the test suites are specifically generated, thereby implementing automatic generation and execution of the test suites. Hence, embodiments of the present disclosure can improve the test running efficiency, implement reliable fault processing, and output a detailed test report.

Figure 8:
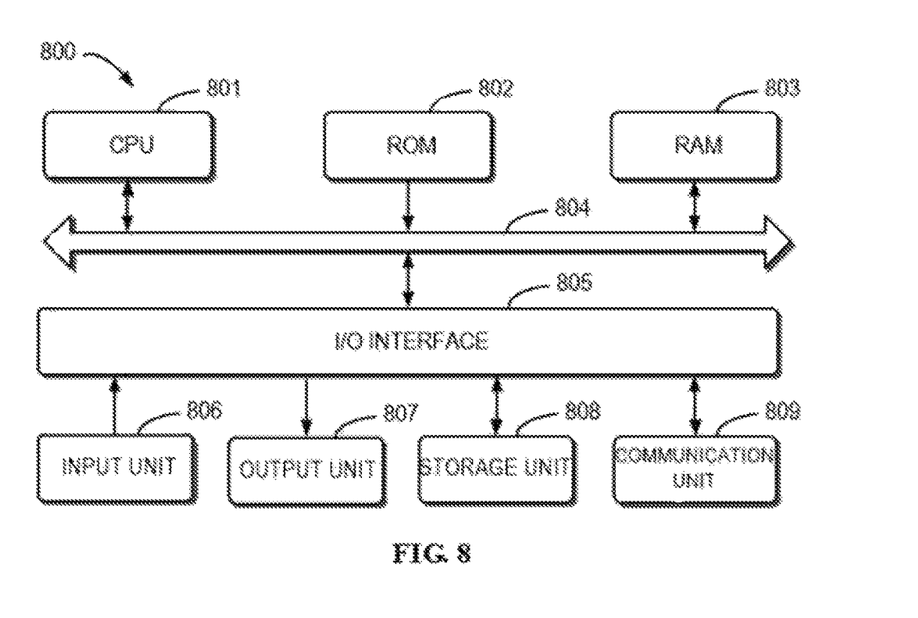
FIG. 8 illustrates a block diagram of a device that may be used to implement an embodiment of the present disclosure.

FIG. 8 illustrates a block diagram of a device 800 which is used to implement an embodiment of the present disclosure. As shown in the figure, the device 800 comprises a central processing unit (CPU) 801 that may perform various appropriate actions and processing based on computer program instructions stored in a read-only memory (ROM) 802 or computer program instructions loaded from a memory unit 808 to a random access memory (RAM) 803. In the RAM 803, there further store various programs and data needed for operations of the device 800. The CPU 801, ROM 802 and RAM 803 are connected to each other via a bus 804. An input/output (I/O) interface 805 is also connected to the bus 804.

Various components in the device 800 are connected to the I/O interface 805, including: an input unit 806 such as a keyboard, a mouse and the like; an output unit 807 such as various kinds of displays and a loudspeaker, and the like; a memory unit 808 such as a magnetic disk, an optical disk, and the like; a communication unit 809 such as a network card, a modem, and a wireless communication transceiver, and the like. The communication unit 809 allows the device 800 to exchange information/data with other devices through a computer network such as the Internet and/or various kinds of telecommunications networks.

Various processes and processing described above may be executed by the processing unit 801. For example, in some embodiments, the method may be implemented as a computer software program that is tangibly embodied on a machine readable medium, e.g., the storage unit 808. In some embodiments, part or all of the computer program may be loaded and/or mounted onto the device 800 via ROM 802 and/or communication unit 809. When the computer program is loaded to the RAM 803 and executed by the CPU 801, one or more steps of the method as described above may be executed.

In some embodiments, the method 200 described above may be implemented as a computer program product. The computer program product may include a computer readable storage medium which carries computer readable program instructions for executing aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

These computer readable program instructions may be provided to a processing unit of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for executing a test case, comprising:
   obtaining a set of test cases to be executed, the set of test cases being divided into one or more test subsets;
   for a test case in the set of test cases:
   determining a test platform type and a test script associated with the test case based on a knowledge base;
   determining, based on the test platform type, a test subset to which the test case belongs;
   executing the test case in the test subset based on the test script; and
   obtaining running information of the test script based on the knowledge base, the running information including runtime information of the test script and being used for the execution of the test case;
   wherein the set of test cases is divided into the one or more test subsets based on the test platform type and the runtime information such that differences in runtime among all of the test subsets are within a threshold range.

2. The method according to claim 1, wherein the obtaining a set of test cases to be executed comprises:
   obtaining, based on a set of components to be tested, the set of test cases by querying the knowledge base.

3. The method according to claim 1, wherein the executing the test case in the test subset comprises:
   executing, by a plurality of test execution engines, the plurality of test subsets in parallel.

4. The method according to claim 1, wherein the executing the test case in the test subset comprises:
   instantiating a test environment for the test platform type based on the test platform type; and
   executing, in the test environment, a plurality of test scripts associated with a plurality of test cases in the test subset sequentially.

5. The method according to claim 4, wherein the executing a plurality of test scripts associated with a plurality of test cases in the test subset sequentially comprises:
   in response to a plurality of faults including a first fault and a second fault occurring during the execution of the test subset, adjusting a first test case associated with the first fault to be after a second test case associated with the second fault in order;

re-executing, for the adjusted plurality of faults, test cases associated with the plurality of faults.

6. The method according to claim 1, further comprising:
after completion of the execution of the test subset, collecting a test result from a running log; and
generating a test report based on the collected test result.

7. The method according to claim 1, wherein the method is used for automatic regression test, and the knowledge base is built by collecting historically executed test cases.

8. A device for executing a test case, comprising:
a processing unit; and
a memory coupled to the processing unit and storing instructions thereon, the instructions, when executed by the processing unit, perform the following acts:
obtaining a set of test cases to be executed, the set of test cases being divided into one or more test subsets;
for a test case in the set of test cases:
determining a test platform type and a test script associated with the test case based on a knowledge base;
determining, based on the test platform type, a test subset to which the test case belongs;
executing the test case in the test subset based on the test script; and
obtaining running information of the test script based on the knowledge base, the running information including runtime information of the test script and being used for the execution of the test case;
wherein the set of test cases is divided into the one or more test subsets based on the test platform type and the runtime information such that differences in runtime among all of the test subsets are within a threshold range.

9. The device according to claim 8, wherein the obtaining a set of test cases to be executed comprises:
obtaining, based on a set of components to be tested, the set of test cases by querying the knowledge base.

10. The device according to claim 8, wherein the executing the test case in the test subset comprises:
executing, by a plurality of test execution engines, the plurality of test subsets in parallel.

11. The device according to claim 8, wherein the executing the test case in the test subset comprises:
instantiating a test environment for the test platform type based on the test platform type; and
executing, in the test environment, a plurality of test scripts associated with a plurality of test cases in the test subset sequentially.

12. The device according to claim 11, wherein the executing a plurality of test scripts associated with a plurality of test cases in the test subset sequentially comprises:
in response to a plurality of faults including a first fault and a second fault occurring during the execution of the test subset, adjusting a first test case associated with the first fault to be after a second test case associated with the second fault in order;
re-executing, for the adjusted plurality of faults, test cases associated with the plurality of faults.

13. The device according to claim 8, the acts further comprising:
after completion of the execution of the test subset, collecting a test result from a running log; and
generating a test report based on the collected test result.

14. The device according to claim 8, wherein the device is used for automatic regression test, and the knowledge base is built by collecting historically executed test cases.

15. A computer program product that is tangibly stored on a non-transient computer readable medium and includes machine-executable instructions, the machine-executable instructions, when executed, for executing a test case by performing the steps of:
obtaining a set of test cases to be executed, the set of test cases being divided into one or more test subsets;
for a test case in the set of test cases:
determining a test platform type and a test script associated with the test case based on a knowledge base;
determining, based on the test platform type, a test subset to which the test case belongs;
executing the test case in the test subset based on the test script; and
obtaining running information of the test script based on the knowledge base, the running information including runtime information of the test script and being used for the execution of the test case;
wherein the set of test cases is divided into the one or more test subsets based on the test platform type and the runtime information such that differences in runtime among all of the test subsets are within a threshold range.

16. The computer program product of claim 15, wherein the obtaining a set of test cases to be executed comprises:
obtaining, based on a set of components to be tested, the set of test cases by querying the knowledge base.

17. A method for executing a test case, comprising:
obtaining a set of test cases to be executed, the set of test cases being divided into one or more test subsets;
for a test case in the set of test cases:
determining a test platform type and a test script associated with the test case based on a knowledge base;
determining, based on the test platform type, a test subset to which the test case belongs; and
executing the test case in the test subset based on the test script;
wherein the executing the test case in the test subset comprises:
instantiating a test environment for the test platform type based on the test platform type; and
executing, in the test environment, a plurality of test scripts associated with a plurality of test cases in the test subset sequentially; and
wherein the executing a plurality of test scripts associated with a plurality of test cases in the test subset sequentially comprises:
in response to a plurality of faults including a first fault and a second fault occurring during the execution of the test subset, adjusting a first test case associated with the first fault to be after a second test case associated with the second fault in order; and
re-executing, for the adjusted plurality of faults, test cases associated with the plurality of faults.

18. A device for executing a test case, comprising:
a processing unit; and
a memory coupled to the processing unit and storing instructions thereon, the instructions, when executed by the processing unit, perform the following acts:
obtaining a set of test cases to be executed, the set of test cases being divided into one or more test subsets;
for a test case in the set of test cases:

determining a test platform type and a test script associated with the test case based on a knowledge base;

determining, based on the test platform type, a test subset to which the test case belongs; and executing the test case in the test subset based on the test script;

wherein the executing the test case in the test subset comprises:

instantiating a test environment for the test platform type based on the test platform type; and    executing, in the test environment, a plurality of test scripts associated with a plurality of test cases in the test subset sequentially; and    wherein the executing a plurality of test scripts associated with a plurality of test cases in the test subset sequentially comprises:

in response to a plurality of faults including a first fault and a second fault occurring during the execution of the test subset, adjusting a first test case associated with the first fault to be after a second test case associated with the second fault in order; and       re-executing, for the adjusted plurality of faults, test cases associated with the plurality of faults.

* * * * *